United States Patent [19]

McKinney et al.

[11] Patent Number: 5,292,784
[45] Date of Patent: Mar. 8, 1994

[54] ANTI-GLARE COATING FOR REFLECTIVE-TRANSMISSIVE SURFACES AND METHOD

[75] Inventors: Walter S. McKinney; Malcolm J. Chatham, II, both of Houston, Tex.

[73] Assignee: Ganns Financial Group, Inc., dba Glare Tech Industries Incorporated, Houston, Tex.

[21] Appl. No.: 425,703

[22] Filed: Oct. 23, 1989

Related U.S. Application Data

[63] Continuation-in-part of Ser. No. 355,769, May 23, 1989, abandoned.

[51] Int. Cl.⁵ .......................... B05D 5/00; C08K 3/00
[52] U.S. Cl. .................................. 524/80; 427/164; 427/165; 427/389.7; 427/64
[58] Field of Search ............... 427/165, 389.7, 164, 427/64; 428/441, 393.5, 500; 536/35; 526/317.1; 523/1; 525/209; 524/80

[56] References Cited

U.S. PATENT DOCUMENTS

| | | | |
|---|---|---|---|
| 3,865,899 | 2/1975 | de Vries | 260/841 |
| 3,898,509 | 8/1975 | Brown, Jr. et al. | 313/478 |
| 3,948,839 | 4/1976 | de Vries | 260/29.4 R |
| 4,132,806 | 1/1979 | Wason | 424/357 |
| 4,157,920 | 6/1979 | Wason | 106/292 |
| 4,161,455 | 7/1979 | Wason | 252/174.25 |
| 4,168,332 | 9/1979 | Leinen et al. | 427/160 |
| 4,202,813 | 5/1980 | Wason | 260/381 R |
| 4,260,454 | 4/1981 | Wason | 162/181 C |
| 4,287,231 | 9/1981 | deCaro | 427/106 |
| 4,336,245 | 6/1982 | Wason | 424/49 |
| 4,422,880 | 12/1983 | Wason | 106/288 B |
| 4,560,581 | 12/1985 | Deal | 427/64 |
| 4,563,612 | 1/1986 | Deal | 313/478 |
| 4,582,761 | 4/1986 | Liu | 428/442 |
| 4,606,934 | 8/1986 | Lee et al. | 427/76 |
| 4,684,675 | 8/1987 | Collier | 523/220 |
| 4,766,010 | 8/1988 | Takeuchi et al. | 427/96 |

FOREIGN PATENT DOCUMENTS

| | | |
|---|---|---|
| 1933767 | 9/1965 | Australia . |
| 8706161 | 10/1987 | PCT Int'l Appl. . |
| 1247511 | 9/1971 | United Kingdom . |
| 2064987 | 6/1981 | United Kingdom . |

*Primary Examiner*—Janyce Bell
*Attorney, Agent, or Firm*—Vaden, Eickenroht, Thompson, Boulware & Feather

[57] ABSTRACT

A glare reducing coating for reflective-transmissive surfaces such as the glass screen of a television or CRT including a resin binder, plasticizer, solvent, and flatting agent. The resin binder is nitrocellulose or an acrylic resin or a mixture of nitrocellulose and acrylic resin, and the particular plasticizer used depends upon the choice of resin binder. Preferred plasticizers are polyesters, phthlates, and alkyds, the amount of plasticizer utilized being determined by the degree of flexibility desired for the dried coating. Silica is the preferred flatting agent, and any of a large number of common organic solvents are utilized.

10 Claims, No Drawings

ANTI-GLARE COATING FOR REFLECTIVE-TRANSMISSIVE SURFACES AND METHOD

BACKGROUND OF THE INVENTION

This application is a continuation-in-part of co-pending application Ser. No. 07/355,763, filed on May 23, 1989, now abandoned, entitled "GLARE REDUCING COMPOSITION AND METHOD".

The present invention relates to improved methods and compositions for reducing glare from a reflective-transmissive surface such as glass. More particularly, the present invention relates to a composition for application to a surface such as the glass screen of a television or CRT which reduces the amount of incident light reflected by that surface and to a polish for use with such coated surfaces.

Glare can be defined as a loss in visual performance and visibility, annoyance or discomfort produced by a luminance in the visual field greater than the luminance to which the eyes are adapted. The problems caused by glare from reflective-transmissive surfaces such as glass ("reflection glare") are well documented. In the case of incident light reflected from the glass surface of a television screen, video display terminal (VDT) and other cathode ray tubes (CRTs), such reflected light reduces the visibility of the information or image being displayed and causes fatigue, eyestrain and/or headache for those who use the device for even modest periods of time. Further, studies have shown that reflections from the screen surface of a VDT increase from about 4% at angles of incidence of 50 degrees or less up to about 35% at angles of 80 degrees. When combined with the well documented fact that VDTs are often used in environments which were designed for, for instance, typewriters such that optimal viewing angles, distances and lighting are not available, the resulting decrease in visibility and increase in discomfort is exaggerated. Cover glass for photographs, art work and the like likewise suffers from such drawbacks.

Many attempts to solve these problems have been utilized in the past with varying degrees of success. For instance, one method of reducing reflection is to etch the front surface of the glass with hydrofluoric acid to diffuse the reflected light. This treatment may, in the case of CRTs, cause characters on the screen to become less defined because the light from the phosphor is transmitted through the etched front surface. A second problem is that the light from the phosphor is diffused along the surface of the CRT screen, resulting in the loss of contrast.

Another option is the use of a filter. There are four types of filters which can be used: circular polarizer, neutral density, notch or color filters, and directional or mesh filters. Each of these types of filters tends to enhance the contrast and increase the legibility of the letters on the screen of, for instance, a VDT. The circular polarizing filter prevents the general light in the room from reaching the VDT front surface and, because such filters are neutral grey in color, appears to enhance the contrast of the VDT image. Neutral density filters uniformly reduce the light passing through them, improving the CRT image contrast since room light needs to pass through the filter twice to reach the eye. Notch filters work similarly but, in addition, selectively remove unwanted wavelengths to reduce glare and improve contrast. Directional filters are usually used with VDTs, and consist of wire or nylon mesh that prevents the part of the general lighting that strikes the mesh from reaching the video screen. The light that passes through the mesh opening is usually reflected from the VDT surface back into the mesh. Good resolution can be maintained with such filters, but the mesh must be fine and placed relatively close to the screen. Hoods can also be used to prevent some unwanted general light from reaching the screen.

Glare reducing coatings are disclosed in a number of prior U.S. patents, including:

| U.S. Pat. No. | Issue Date |
|---|---|
| 3,865,899 | Feb. 11, 1975 |
| 3,898,509 | Aug. 5, 1975 |
| 3,948,839 | Apr. 6, 1976 |
| 4,157,920 | Jun. 12, 1979 |
| 4,168,332 | Sep. 18, 1979 |
| 4,560,581 | Dec. 24, 1985 |
| 4,563,612 | Jan. 7, 1986 |
| 4,582,761 | Apr. 15, 1986 |

The coatings described in these patents are characterized by a number of limitations and disadvantages which decrease their utility such that, in spite of these previous attempts to solve the problem of glare from reflective-transmissive surfaces, there is still a need to reduce glare. Specifically with regard to an anti-glare coating, there is a need for a coating which dries quickly, can be applied by unskilled persons, dries to a film which is flexible enough so as not to be susceptible to scraping or marring and does not crack over time, adheres well to the surface to which it is applied, is resistant to moisture and humidity (e.g., does not "blush"), does not adversely affect resolution, need not be baked onto the surface to which it is applied or subjected to elevated temperature to dry or cure, either does not give off an odor once it is dry or which gives off an odor which is not objectionable, and which can be removed, if so desired, by wiping the coated surface with a common organic solvent. It is, therefore, an object of the present invention to provide such a coating. Other objects, and the advantages of the present invention, will be made apparent to those skilled in the art by the following description of the preferred methods and compositions of the present invention.

SUMMARY OF THE INVENTION

These objects are achieved by providing an improved glare reducing coating for reflective-transmissive surfaces comprising a resin binder, a quantity of a plasticizer compatible with said resin binder that is sufficient to impart a desired degree of flexibility to said resin binder when applied to a reflective-transmissive surface, and a common organic solvent in which the resin binder is solubilized for application to the reflective-transmissive surface. The solubilized resin binder also includes a flatting agent suspended therein. These components are generally present in the composition of the present invention in the following approximate percentages:

| resin binder | about 7.59 to about 22.85% |
| plasticizer | about 1.00 to about 12.45% |
| common organic solvent | about 63.10 to about 90.50% |
| flatting agent | about 0.60 to about 1.60%. |

The composition may also include an antistatic agent, an ultra-violet light absorber, an adhesive agent, various surfactants, a suspension agent and/or a dispersing agent.

A polish for use on a surface coated with this glare reducing composition includes a common organic solvent and a wax or paraffin. The polish is either sprayed in a mist onto the coated surface or applied to a lint-free cloth or wick applicator for application to the surface.

Also provided is a method for decreasing the glare from a reflective-transmissive surface comprising blending a resin binder with sufficient plasticizer to impart a desired degree of flexibility to the resin binder once applied to a reflective-transmissive surface to be coated in a common organic solvent, suspending a flatting agent in the solubilized resin binder, and then applying the solubilized resin binder having the flatting agent suspended therein to a reflective-transmissive surface. Application to the reflective-transmissive surface is accomplished by aerosol spray, wiping or by contacting the reflective-transmissive surface with a wick saturated with the solubilized resin binder. Depending upon the character of the surface to which the solubilized resin binder is applied and the conditions under which glare is to be reduced, a polish may also be applied to the coated surface to improve the visibility of the image to be viewed therethrough.

DETAILED DESCRIPTION OF PREFERRED EMBODIMENTS

As used herein, the phrase "reflective-transmissive surface" refers to any surface which is capable of transmitting light therethrough but which also reflects incident light from the surface thereof. Examples of such surfaces include glass and plastic as, for instance, the glass viewing screen of a television, video display terminal, electronic test equipment, oscilloscope, word processor or personal computer, and other cathode ray tubes (CRTs), room windows, protective glass or plastic, the glass covering a photograph, print or painting, or any other surface through which something is viewed and which tends to reflect incident light.

The phrase "resin binder", as used herein, refers to those film forming components of the composition of the present invention which function as a vehicle for application of a flatting agent to a reflective-transmissive surface. After application of such components to a reflective-transmissive surface in a solution in which the flatting agent is suspended and evaporation of the solvent, such components form a dry film in which the flatting agent is disposed on that surface.

Resin binders which are preferred for use in connection with the composition and method of the present invention are those which may be characterized as having high capacity for adhesion to the particular reflective-transmissive surface to which they are to be applied and which do not distort the image which is to be viewed through the surface to which they are applied. A further characteristic of the preferred film forming resin binders is that, by addition of a sufficient quantity of a plasticizer compatible therewith, the resin binder is characterized by a degree of flexible plasticity which prevents the cracking of the film after application of the solubilized resin binder to a reflective-transmissive surface and evaporation of the solvent and which decreases the susceptibility of the film to peeling if, for example, the film is damaged or scratched by an accidental scrape. Another characteristic of the preferred resin binder having the plasticizer added thereto is durability sufficient to resist marring by contact with the film during normal use, e.g., by tapping the surface or using a ball point pen as a pointer contacting, for instance, a video display terminal. All such desirable characteristics are referred to collectively as the "flexibility" of the dried resin binder. The preferred resin binders are also characterized by lack of odor and the ability to be re-solubilized by wiping the coated reflective-transmissive surface with, for instance, a cloth saturated with a common organic solvent.

Examples of resin binders which are preferred for use in connection with the compositions and methods of the present invention are those thermoplastic polymers and copolymers which may be characterized as acrylic resins, epoxy resins, and those thermoplastic polymers of glucose which are generally referred to as nitrocellulose. Appropriate acrylic resins include polymers and copolymers of acrylic (propenoic) acid, methacrylic acid, esters of acrylic and methacrylic acid, acrylonitrile, and polyvinyl acetate. Representative acrylic resins include those available under the brand names DORESCO AC4-79 (Dock Resins Corporation, Linden, N.J.), ELVACET (E. I. duPont de Nemours Co., Wilmington, Del.), NEOCRYL (Polyvinyl Chemical Industries (Wilmington, Mass.), ACRYLOID (Rohm & Haas Co., Philadelphia, Pa.), and stock no. 16-0106 (Cargill, Enis, Tex.). Epoxy resins such as those available from Shell Chemical Co. (Houston, Tex.) under the brand name EPON are appropriate for use as the resin binder as well. Appropriate nitrocelluloses are available from, for instance, Hercules, Inc. (Wilmington, Del.) and ICI United States, Inc. (Wilmington, Del.).

Acrylic resins are less susceptible to blushing, e.g., condensation of moisture between the film and the reflective-transmissive surface, than those glare reducing coatings formulated in accordance with the present invention which include a nitrocellulose resin binder. Coatings including acrylic resins also distort, or blur, the image to be viewed through the reflective-transmissive surface less than coatings including nitrocellulose resin binders; however, the amount of blurring is so slight that highly satisfactory results have been achieved with nitrocellulose. In some applications, a slight amount of blurring has actually been found to be advantageous; the eye is effectively "fooled" into believing that the image being viewed is "better" when that image is slightly blurred.

The resin binder is used in weight percent of from about 7.59 up to about 22.85%, the preferred amount of resin binder depending upon whether an acrylic or nitrocellulose resin, or a mixture of acrylic and nitrocellulose resins, is utilized. In the case of the acrylic resin, the preferred weight percent of resin binder is between about 7.59 and about 13.63%, in the case of nitrocellulose resins, it is preferred that between about 8.75 and 22.85% resin by weight be used in the composition of the present invention, and in the case of a mixture of the two resins, a weight percent of 7.59 and 22.85% is used, with about 8.27 up to about 11.10% total resin being the presently preferred range.

The particular plasticizer utilized depends in large part upon the resin binder component of the composition of the present invention. In the case of an acrylic resin, the preferred plasticizers for use with the film forming resin binder include the various phthlate plasticizers commonly used with acrylic resins such as the FLEXOL plasticizers (Union Carbide Corp. (New York, N.Y.) and the high molecular weight phthlate esters such as diisooctyl, diisononyl, and diisodecyl phthlate which are available, for instance, under the brand name JAYFLEX (Exxon Chemical Americas, Houston, Tex). Preferred plasticizers for use with nitrocellulose resins include oil free polyesters, the high molecular weight phthlate esters such as methyl isobutylcarbinyl phthlate and di-2-ethylhexyl phthlate, modified unsaturated fatty acids such as 2-butoxyethyl stearate, 2-butoxyethyl oleate, 2-ethoxyethyl ricinoleate, and butylacetyl ricinoleate, and various alkyd resins. In the case of mixtures of nitrocellulose and acrylic resins, oil free polyesters, sucrose acetates such as sucrose acetate butyrate (SAIB) or sucrose octaacetate, and polyethers may be used to advantage as the plasticizer. Of particular utility as plasticizers are the polyester resin stock no. 7203 (Cargill, Enis, Tex.), the so-called secondary plasticizers such as those available under the brand name FLEXOL (Union Carbide Corp.), and the alkyd resins such as those available under the brand name PARAPLEX (Rohm & Haas Co., Philadelphia, Pa.), AROPLAZ (Spencer Kellogg Co., Buffalo, N.Y.), and stock no. A-0139 (Guardsman Products, Grand Rapids, Mich.).

The amount of plasticizer used with the resin binder is sufficient to impart sufficient flexibility to the resin binder to prevent marring, cracking, or peeling of the resin binder from the surface after application thereto as described above. Such desirable properties can be measured, for instance, by accelerated aging tests conducted with UV light, temperature extremes, and standardized abrasion tests. That amount depends on the particular resin binder utilized, but ranges generally from about 1.00 to about 12.45%. In the case of a glare reducing composition including an acrylic resin, the preferred range of plasticizer is from about 6.42 up to about 12.45%; in the case of a composition including a nitrocellulose resin, the preferred plasticizer content ranges from between about 1.00 to about 4.65%. A range between the two extremes of about 1.00 up to about 12.45% is also appropriate for use in a glare reducing composition including both resin binders, the preferred range being from about 6.90% up to about 7.37%.

The preferred flatting agent for use in connection with the composition of the present invention is silica, which is available in many forms which may be used to advantage. Particular success has been achieved with silicas having a particle size below about 10 micrometers with or without a suspending agent, e.g., a more finely divided silica. Such silicas are available from Degussa, Inc. (Pigments Div., Telesboro, N.J.) and PPG Industries (Chemical Div., Pittsburgh, Pa.) under the brand names TS 100 (Degussa), AEROSIL (Degussa) and LOVEL (PPG).

The flatting agent comprises from about 0.60 up to about 1.60% by weight of the glare reducing coating of the present invention, depending upon the desired gloss. Compositions having a gloss, measured with a Hunter D-48 Gloss Meter (3 mil drawdown, black glass), of from about 5 up to about 50 will give satisfactory results in connection with the present invention. The flatting agent together with the resin binder and plasticizer comprise the solids of the composition of the present invention, and total solids content preferably ranges from about 7 up to about 23% by weight in the proportions of resin binder, plasticizer and flatting agent set out above. In the same manner, the viscosity of the composition of the present invention is adjusted by varying total solids content so as to obtain a composition having a viscosity of between about 10 and about 25 sec. (Zahn #2 cup at room temperature), a range of about 12 to about 18 being preferred.

As used herein, the phrase "common organic solvent" refers to those organic solvents, well-known to those skilled in the art, for solubilizing the particular film forming resin binder utilized but with sufficient volatility to evaporate after application of the glare reducing coating to a reflective-transmissive surface to leave a dry film thereon. Such solvents include aromatic solvents such as toluene, xylene, benzene, ethyl benzene, and so on, and the so-called chemical solvents, including various ethers, ketones and esters such as acetone, methyl ethyl ketone, methyl isobutyl ketone, ethyl acetate, propyl acetate, butyl acetate, isobutyl acetate, isoamyl acetate, methyl isoamyl ketone, methyl ethyl ketone, methyl isobutyl ketone, and so on. The particular resin binder utilized and the desired degree of viscosity of the glare reducing coating are factors influencing the particular solvent of choice. Satisfactory results have been obtained using toluene as the solvent for glare reducing coatings including an acrylic resin, and mixtures of toluene, xylene, methyl isobutyl ketone and isobutyl acetate have been used to advantage with nitrocellulose resin binders. Also included within the dfinition of a common organic solvent for the purpose of the present invention are those proprietary solvents for nitrocellulose resins sold by Eastman Chemical Products (Kingsport, Tenn.) and those available under the brand name CELLOSOLVE (Union Carbide Crop., New York, N.Y.) such as butyl-CELLOSOLVE, dibutyl-CELLOSOLVE, and n-hexyl-CELLOSOLVE. Further, in the case of nitrocellulose resin binders, it is sometimes advantageous to use a co-solvent to facilitate the solubilization of the resin binder, and various alcohols are preferred for this purpose, including ethanol, butanol, and isopropyl alcohol.

The improved glare reducing coating of the present invention may also include various additives such as a wetting agent or surfactant, adhesive agent, dye for a toning effect, ultraviolet light absorber, antistatic agent, and/or a suspension agent and/or dispersing agent. A fragrance may also be included to mask the odor of the resin binder, if necessary. Silicone additives are particularly useful as adhesive agents, and preferred silicone additives are, for instance, those available from Dow Corning such as DC-11 and DC-25. Preferred ultraviolet absorbers are the benzophenones such as 2-hydroxy-4-octyloxybenzophenone and 2,2'-dihydroxy-4,4'-dimethoxybenzophenone, the benzotriazoles such as 2-(2'-hydroxy-5'-octylphenyl) benzotriazole and 2-(3',5'-di-tert-butyl-2'-hydroxyphenyl)-5chlorobenzotriazole (di-tCBT), substituted acrylates such as ethyl-2-cyano-3,3-diphenyl acrylate and p-methoxybenzylidene malonic acid dimethyl ester, and aryl esters such as phenyl salicylate, resorcinol monobenzoate, and 2,4-di-t-butylphenyl-3,5-di-t-butyl-4-hydroxybenzoate. The UV absorber di-tCBT, available under the brand name TINUVIN 327 (Ciba-Geigy Corp., Plastics & Additives Division (Hawthorne, N.Y.)) is particularly preferred. Combinations of these types of ultraviolet absorbers can also be utilized to advantage. Dyes, especially gray tints, are particularly useful for optimizing a glare reducing coating in accordance with the present invention for use on, for instance, television screens. A presently preferred dye for use in such a coating is available under the brand name ORASOL BLACK CN (Ciba-Geigy Corp.). Such additives are generally included in the composition of the present invention in weight percentages of less than 1% each or, when calculated as a percent of total solids, between about 1 and about 6%.

The glare reducing coating of the present invention is applied to a reflective-transmissive surface in any of several ways, including by spraying as for instance, an aerosol spray, wiping, or wick applicator. Application can also be accomplished by self-pumping applicator or by a device such as that used for applying liquid shoe polish which uses hand pressure and contact with the surface to be coated by a brush or pad to saturate the brush or pad with the composition, thereby applying the liquid to that surface. Particular success in applying the coating has been obtained with handheld spray equipment, specifically, of the airless type such as that available from Wagner Spray Tech (U.S. and Germany) under the brand name PICO-BEL. Depending upon the method of application, the composition of the glare reducing coating may be altered to facilitate application. For instance, if application is by aerosol spray, the total solids content of the coating is reduced as compared to the total solids content of a coating which is to be applied by use of a wick saturated with the solubilized resin binder; formulations for application with a wick generally include a lower solids content than formulas which are applied by wiping.

The polish formulated in accordance with the present invention comprises a common organic solvent and a wax or paraffin, and may additionally include additives such as an antifoaming agent. The polish restores clarity to the image viewed through the reflective-transmissive surface by removing foreign matter (e.g., ink deposited thereon by using a pen as a pointer) and smoothing out the coating by, for instance, filling small nicks or surface irregularities. The polish also apparently reduces the likelihood of adherence of foreign matter to the coating; qualitative observation indicates that fingerprints and ink are less visible on a coated surface to which the polish has been applied, leading to the conclusion that less foreign matter may adhere to the coated surface to which the polish has been applied.

In a presently preferred embodiment, the wax is common paraffin (GULF WAX, Gulf Oil Co.), but it will be understood by those skilled in the art who have the benefit of this disclosure that other commonly available materials are equally suitable, this wax having been chosen because of its availability and extremely low cost. In general, waxes having a melting point of below about 135° F. are appropriate for use in the polish of the present invention. The common organic solvent utilized is, for instance, any of the aromatic or chemical solvents listed above, and may also include a co-solvent. Preferred antifoaming agents are silicone based, and the DC-11 (Dow Corning, Corning, N.Y.) and VISCASIL fluids (General Electric Company, Silicone Products Division, Waterford, N.Y.) are particularly preferred.

The present invention can be better understood by referring to the following description of several examples of presently preferred embodiments of glare reducing coatings formulated in accordance with the present invention. Such examples are for purposes of exemplification, and not limitation, of the scope of the present invention.

EXAMPLE I

A mixture comprised of 27.04% isopropyl alcohol (all percentages by weight), 31.81% nondrying alkyd (60% in xylene) (Guardsman Products A-0139), 35.79% nitrocellulose (70% in isopropyl alcohol) (Hercules, Inc. RS¼-sec vis.), 0.60% suspension agent (Degussa, AEROSIL 972), and 4.77% flatting agent (PPG Industries, LOVEL 27) were mixed for about ten minutes at room temperature. To that mixture was added enough methyl isobutyl ketone to adjust total solids content to 55.25%, and that adjusted mixture was dispersed to a 6+ grind. To that adjusted mixture was added sufficient isobutyl acetate ester solvent (Eastman Chemical Products, Kingsport, Tenn.) to bring the final weight percentage content to 20.01%, toluene to 17.66%, xylene to 15.89%, butyl-CELLOSOLVE (Union Carbide Corp, New York, N.Y.) to 7.06%, and silicone solution (General Electric Company, Silicone Products Division, Waterford, N.Y., 1% SF-69 in 99% xylene) to 0.35%. After mixing for a sufficient time to thoroughly blend the various components, total solids content was 14.65% by weight and viscosity was 17–18 sec Zahn #2 cup. When applied to glass with a lint-free cloth saturated with the composition, this composition resulted in a gloss of 11–12 using the Hunter D-48 Gloss Meter (3 mil. drawdown, black glass).

EXAMPLE II

The same composition as described in Example I was prepared in the same manner, but total solids was decreased to 14.43% by reducing the final content of flatting agent to 1.06%. Viscosity of the resulting composition was the same as in Example I, but gloss increased to 20–25.

EXAMPLE III

A 150 gallon tank with a 7½ hp variable speed Meyers mixer with an 8 inch Meyers blade agitating at low rpm (about 500) was charged with a mixture of 49.32% isobutyl acetate (Eastman Chemical Products), 2.10% suspension agent (a half and half mixture of AEROSIL 972, Degussa, and RAYBO 94, Raybo Chemical Company, Huntington, W. Va.), 1.05% surfactant (Triton CF-10, Rohm & Haas Co.), 16.56% diisononyl phthlate (JAYFLEX DINP, Exxon Chemical Americas), 3.95% flatting agent (TS-100, Degussa) and 27.03% nitrocellulose (70% in isopropyl alcohol) (Hercules, Inc. RS¼-sec. vis.), total solids content of 42.5% by weight. The speed of the mixer was then increased to about 1200 rpm and the nitrocellulose allowed to cut for 20 minutes.

A tank of the same size, using the same size Meyers mixer agitating at 600–700 rpm, was charged with a mixture of 56.33% isobutyl acetate (Eastman Chemical Products), 16.14% nitrocellulose (70% in isopropyl alcohol) (Hercules, Inc., RS¼-sec. vis.), 5.38% methyl isoamyl ketone, 21.52% ethyl alcohol 95%, and 0.53% silicone solution (General Electric Company, 1% SF-69 in 99% xylene). To 281 parts of that mixture was added 105 parts of the nitrocellulose-plasticizer mixture prepared as described above, and then 120 parts each of methyl isobutyl ketone and N-propyl acetate were added. After mixing for several minutes and filtering through a 10 micron filter, total solids content was 12.19% by weight. Viscosity was 15"–20" Zahn #2 cup at 77° F. and gloss was 9–12 sheen at a 60° angle.

EXAMPLE IV

A mixture of 2.95% diisononyl phthlate (JAYFLEX DINP, Exxon Chemical Americas), 59.08% toluene, 35.45% acrylic resin (ACRYLOID B-66, Rohm & Haas Co.), 0.44% suspension agent (AEROSIL 972, Degussa) and 2.07% flatting agent (PPG Industries, LOVEL 27) was prepared by mixing for about ten minutes at room temperature. That mixture was dispersed to a 6+ grind, and toluene to bring final concentration to 76.76% and silicone solution to bring final concentration to 0.35% (General Electric Company, 1% SF-69 in 99% xylene) was added and mixed as described in Example I, above. Total solids content was 22.9% by weight and the gloss was 25-30 (3 mil. drawdown, black glass).

EXAMPLE V

Using the same equipment as described in Example III, a glare reducing coating in accordance with the present invention was prepared having the following content (all percentages by weight):

| | |
|---|---|
| isopropyl alcohol | 8.35% |
| toluene | 18.42% |
| methyl isobutyl ketone | 9.82% |
| isobutyl acetate | 20.88% |
| Eastman EP solvent | 7.37% |
| xylene | 16.58% |
| LOVEL 27 | 0.77% |
| AEROSIL 972 | 0.12% |
| DORESCO AC4-79 | 2.46% |
| 18-25 cps nitrocellulose (Hercules) | 4.91% |
| ½ sec nitrocellulose (Hercules) | 2.46% |
| 7203 polyester (Cargill) | 7.37% |
| DC-11 (Dow Corning) | 0.49% |
| ORASOL BLACK CN | 0.001% |

After mixing and filtering as described in Example III, total solids content was 12.68% by weight. Viscosity was 16"-17" Zahn #2 cup at 77° F. and, when sprayed onto black glass with a hand-held aerosol spray pump and measured as described in Example I, gloss was 35-40 sheen at a 60° angle.

EXAMPLE VI

Using the same equipment as described in Example III, a glare reducing coating in accordance with the present invention was prepared having the following content (all percentages by weight):

| | |
|---|---|
| isopropyl alcohol | 8.30% |
| toluene | 18.30% |
| methyl isobutyl ketone | 9.76% |
| isobutyl acetate | 20.88% |
| Eastman EP solvent | 7.32% |
| xylene | 16.46% |
| LOVEL 27 | 1.46% |
| AEROSIL 972 | 0.12% |
| DORESCO AC4-79 | 2.44% |
| 18-25 cps nitrocellulose (Hercules) | 4.88% |
| ½ sec nitrocellulose (Hercules) | 2.44% |
| 7203 polyester (Cargill) | 7.32% |
| DC-11 (Dow Corning) | 0.49% |

After mixing and filtering as described in Example III, total solids content was 13.29% by weight. Viscosity was 16"-17" Zahn #2 cup at 77° F. and, when sprayed onto black glass and measured as described in Example I, gloss was 18-22 sheen at a 60° angle.

EXAMPLE VII

Using the same equipment as described in Example III, a glare reducing coating in accordance with the present invention was prepared having the following content (all percentages by weight):

| | |
|---|---|
| isopropyl alcohol | 8.35% |
| toluene | 18.42% |
| methyl isobutyl ketone | 9.82% |
| isobutyl acetate | 20.88% |
| Eastman EP solvent | 7.37% |
| xylene | 16.58% |
| LOVEL 27 | 0.77% |
| AEROSIL 972 | 0.12% |
| DORESCO AC4-79 | 2.46% |
| 18-25 cps nitrocellulose (Hercules) | 4.91% |
| ½ sec nitrocellulose (Hercules) | 2.46% |
| 7203 polyester (Cargill) | 7.37% |
| DC-11 (Dow Corning) | 0.49% |
| ORASOL BLACK CN | 0.001% |

After mixing and filtering as described in Example III, total solids content was 12.21% by weight. Viscosity was 16-18 Zahn #2 cup at 77° F. and, when sprayed onto black glass using a PICO-BEL type 0165 airless sprayer at a distance of from about 8 to 10 inches from the glass and measured as described in Example I, gloss was 50 sheen at a 60° angle.

EXAMPLE VIII

Using the same equipment as described in Example III, a glare reducing coating in accordance with the present invention was prepared having the following content (all percentages by weight):

| | |
|---|---|
| isopropyl alcohol | 0.84% |
| toluol | 26.10% |
| methyl isobutyl ketone | 9.61% |
| isobutyl acetate | 20.36% |
| Eastman EP solvent | 7.19% |
| LOVEL 27 | 0.84% |
| AEROSIL 972 | 0.12% |
| DORESCO AC4-79 | 2.40% |
| 18-25 cps nitrocellulose (Hercules) | 4.79% |
| ½ sec nitrocellulose (Hercules) | 2.40% |
| 7203 polyester (Cargill) | 7.19% |
| DC-11 (Dow Corning) | 0.48% |
| ORASOL BLACK CN (Ciba-Geigy) | 0.02% |
| TINUVIN 327 (Ciba-Geigy) | 0.59% |

After mixing and filtering as described in Example III, total solids content was 12.47% by weight. Viscosity was 16-18 Zahn #2 cup at 77° F. and, when sprayed onto black glass as described in Example VII and measured as described in Example I, gloss was 30 sheen at a 60° angle.

EXAMPLE IX

Using the same equipment as described in Example III, a glare reducing coating in accordance with the present invention was prepared having the following content (all percentages by weight):

| | |
|---|---|
| isopropyl alcohol | 8.16% |
| toluol | 11.99% |
| toluene | 6.00% |
| methyl isobutyl ketone | 9.60% |
| isobutyl acetate | 20.40% |
| Eastman EP solvent | 7.20% |
| xylol | 18.00% |

| | |
|---|---|
| LOVEL 27 | 0.67% |
| AEROSIL 972 | 0.12% |
| DORESCO AC4-79 | 2.40% |
| 18-25 cps nitrocellulose (Hercules) | 4.80% |
| ¼ sec nitrocellulose (Hercules) | 2.40% |
| 7203 polyester (Cargill) | 7.20% |
| DC-11 (Dow Corning) | 0.48% |
| ORASOL BLACK CN (Ciba-Geigy) | 0.02% |
| TINUVIN 327 (Ciba-Geigy) | 0.59% |

After mixing and filtering as described in Example III, total solids content was 12.31% by weight. Viscosity was 16-18 Zahn #2 cup at 77° F. and, when sprayed onto black glass as described in Example VII and measured as described in Example I, gloss was 40 sheen at a 60° angle.

EXAMPLE X

A preferred polish formulated in accordance with the present invention included the following (all percentages by weight):

| | |
|---|---|
| xylol | 40.82% |
| mineral spirits | 40.80% |
| isopropyl alcohol | 4.09% |
| VISCASIL 60M (General Electric) | 9.52% |
| GULF WAX (Gulf Oil Company) | 4.76% |

EXAMPLE XI

Using the same equipment as described in Example III, a glare reducing coating in accordance with the present invention was prepared having the following content (all percentages by weight):

| | |
|---|---|
| isopropyl alcohol | 8.00% |
| toluene | 11.78% |
| AEROSIL 972 | 0.12% |
| LOVEL 27 | 0.71% |
| JAYFLEX DINP (Exxon Chemical) | 1.17% |
| ¼ sec nitrocellulose (Hercules) | 7.10% |
| methyl isobutyl ketone | 11.78% |
| methyl ethyl ketone | 23.56% |
| butyl-CELLOSOLVE | 11.78% |
| isobutyl acetate | 23.56% |
| DC-11 (Dow Corning) | 0.47% |

After mixing and filtering as described in Example III, total solids content was about 7% by weight. When sprayed onto black glass as described in Example VII, allowed to dry for 15 minutes, wiped with the polish of Example I and measured as described in Example I, gloss was 40 sheen at a 60° angle.

EXAMPLE XII

To a 150 gallon equipped with a 7½ hp Meyers mixer with an eight inch blade, the following (all percentages by weight) were added and mixed at about 500 rpm:

| | |
|---|---|
| isopropyl alcohol | 4.5% |
| toluene | 8.0% |
| AEROSIL 972 | 0.1% |
| LOVEL 27 | 0.5% |
| DORESCO AC4-79 | 1.8% |
| 7203 polyester (Cargill) | 4.6% |
| SAIB-90T (Eastman Chemical) | 1.4% |
| FLEXOL 4GO (Union Carbide) | 0.9% |
| EPON 1001-X-75 (Shell Chemical) | 0.9% |
| ¼ sec nitrocellulose (Hercules) | 1.9% |

| | |
|---|---|
| 18-25 cps nitrocellulose (Hercules) | 3.7% |
| TINUVIN 327 (Ciba-Geigy) | 0.7% |
| methyl isobutyl ketone | 3.4% |

After adding the methyl isobutyl ketone, rpm was increased to 1200 and temperature allowed to rise to between about 100° to about 110° F. Agitation speed was then decreased to about 500 rpm and the following were added:

| | |
|---|---|
| methyl isobutyl ketone | 7.4% |
| isopropyl alcohol | 2.4% |
| toluene | 13.1% |
| Eastman EP solvent | 6.7% |
| xylene | 17.6% |
| isobutyl acetate | 19.7% |
| DC-11 (Dow Corning) | 0.5% |
| ORASOL BLACK CN (Ciba Geigy) | 0.01% |
| Dow Corning 25 | 0.1% |

After mixing and filtering as described in Example III, total solids content was about 12.5% by weight. When sprayed onto black glass as described in Example VII, allowed to dry for 15 minutes, wiped with the polish of Example X, and measured as described in Example I, gloss was 40 sheen at a 60° angle. Viscosity was 15-18 sec Zahn #2 cup at about 77° F.

Using an anti-glare coating formulated in accordance with Example IX, which includes 6% UV absorber on a percent solids basis, and another coating formulated with all the same components but having a 4% (calculated on a percent solids basis) UV absorber content (coatings 1 and 2, respectively), spectral transmittance measurements were made in a 200 nm to 800 nm waveband on a plate glass sample, a piece of plate glass with coating 1 applied thereto, and plate glass with a coating 2 applied thereto that had been polished with a polish formulated in accordance with Example X.

The uncoated plate glass sample began transmitting in the UV at 300 nm, achieved 85% transmittance at 350 nm, 98% transmittance at 400 nm and slowly declined to 79% transmittance at 800 nm. The coating 1 sample began transmitting UVR at 305 nm, increased to 11% transmittance at 350 nm, achieved 70% transmittance by 450 nm, and continued to remain ±3% to 800 nm. The coating 2 sample absorbed UVR to 380 nm, increased to 22% at 400 nm, and undulated around 70% until 800 nm was achieved.

Contrast, glare, and intensity measurements were made on a commercially available high gloss VDT display unit with half of the screen being coated with the anti-glare coating of the present invention and the second half uncoated. The anti-glare coating utilized was formulated as set out in Example IX, above, but without the UV absorber TINUVIN 327. A commercially available desk lamp with a 75 W incandescent bulb was used for a glare source. The glare source was two meters from the screen and placed on approximately the same spot on the other side of the screen. Measurements were made with a Pritchard Model 109B photometer using the six minute aperture. The procedure was to measure the letter luminance, then the background luminance, for both halves with the luminance of the glare source alternately directed to the coated and clear halves of the VDT screen. The following data resulted:

Coated Side:

| | |
|---|---|
| letter | 40 cd/m$^2$ |
| background | 66.6 cd/m$^2$ |
| glare source | 200 cd/m$^2$ |

Contrast = $L_t - L_b/L_b$ or
    40 cd/m$^2$ − 66.6 cd/m$^2$/66.6 cd/m$^2$
Contrast = 0.4

Clear Side:

| | |
|---|---|
| letter | 31.5 cd/m$^2$ |
| background | 73.2 cd/m$^2$ |
| glare source | 1620 cd/m$^2$ |

Contrast = −0.6

Coated Side Glare Factor:

CGF = clear side glare source/coated side glare source
    = 1620 cd/m$^2$ = 7.37 or 737% less glare The VDT had black letters with a grey background such that contrast is negative, therefore varying between 0 and −1. The coated side of the screen showed a contrast of −0.4, e.g., had a higher contrast (by 0.2) than the clear side. The higher luminance value for the letter on the coated side of the screen indicates that light from the VDT passing through the coating is trapped and scattered within the coating, causing the increased luminance measurement. The glare measurements demonstrate that a coating formulated in accordance with the present invention effects a 737% reduction in glare compared to the clear side.

That same coating was also tested in a manner illustrating the contribution of the plasticizer to the flexibility of the anti-glare coating of the present invention. The coating was applied to a glass substrate and subjected to temperatures ranging from −50° F. to 200° F. by placing in a container with a small amount of liquid nitrogen (−196° C.); the −50° F., −40° F. and −30° F. temperatures were maintained by adding liquid nitrogen. Temperatures of −20° F. and above were obtained by utilizing environmental chambers and convection ovens. Test data indicates that these temperatures had no effect on the sample.

Glass samples having that same coating applied thereto were also subjected to accelerated aging tests. The conditions of the test and the aging factor each condition imparts is illustrated by the following table:

| Condition | Aging Factor |
|---|---|
| 100% UV enviornment | 25X |
| 10° C. temperature increase | 2X |
| 24 hour exposure | 2X |

Samples exposed to these conditions experience the equivalent of about two years of UV aging for every seven days of exposure. Samples were visually inspected under test conditions and normal light, and portions of the samples were inspected under a microscope, to look for microfractures or other signs of distress not visible to the unaided eye, at seven, fourteen and twenty-one days. The only effect noted was a slight discoloration at twenty-one days.

A Tabor abrasion test was performed to determine the abrasion resistance of the non-glare coating. The ASTM designation for this procedure is ASTM D4060. A 0.5 mil coating of that same coating was evaluated with a 500 gram load and 350 cycles. The results were as follows:

| Coating thickness | No. cycles | Wear cycles per Mil | Wear Index |
|---|---|---|---|
| 0.5 Mil | 350 | 700 | 0.48 |

It is believed that the good aging, temperature, and abrasion resistance characteristics are the result of the inclusion of sufficient plasticizer in the composition of the present invention to impart the flexibility necessary to achieve these characteristics.

Although described in terms of the preferred embodiments set out above, those skilled in the art who have the benefit of this disclosure will recognize that the present invention is not restricted to the specific formulations described therein. Instead, the spirit and scope of the present invention is set out in the following claims.

What is claimed is:

1. A composition for application to a reflective-transmissive surface for reducing glare therefrom that is polished by wiping with a polish comprising an organic solvent and a wax, said composition comprising:
   between about 7.59 and about 22.85% of a resin binder;
   between about 63.10 and about 90.50% of a solvent in which said resin binder is solubilized for application to the reflective-transmissive surface;
   a quantity of plasticizer compatible with said resin binder sufficient to impart flexibility to said resin binder after application to the reflective-transmissive surface and evaporation of said solvent therefrom; and
   between about 0.60 and about 1.60% of a flatting agent suspended in the solubilized resin binder.

2. A composition for reducing glare when applied to a reflective-transmissive surface comprising:
   between about 7.59 and about 29.00 weight percent of a mixture of a nitrocellulose resin and an acrylic resin;
   between about 63.10 and about 90.50 weight percent of an organic solvent;
   a plasticizer compatible with each of said nitrocellulose resin and said acrylic resin, said plasticizer being selected from the group consisting of polyesters, phthalate diesters, alkyds, and nitrocellulose, and comprising a percentage sufficient to impart flexibility to said nitrocellulose resin and said acrylic resin when dried on a reflective-transmissive surface after being solubilized in said organic solvent for application to the reflective-transmissive surface, said percentage of plasticizer ranging from about 1.00 up to about 12.45 weight percent; and
   between about 0.60 and about 1.60 weight percent of a flatting agent suspended therein.

3. The glare reducing composition of claim 2 wherein said plasticizer is an alkyd.

4. The glare reducing composition of claim 2 wherein said resin binder is an unsaturated polyester.

5. The glare reducing composition of claim 2 wherein said plasticizer is a phthalate ester.

6. The glare reducing composition of claim 2 wherein said flatting agent is silica.

7. The glare reducing composition of claim 2 additionally comprising silicone.

8. The glare reducing composition of claim 2 comprising between about 7 and about 23% total solids content.

9. The glare reducing composition of claim 2 additionally comprising an ultraviolet light absorber.

10. The glare reducing composition of claim 2 additionally comprising a dye.

* * * * *